Figure 10:
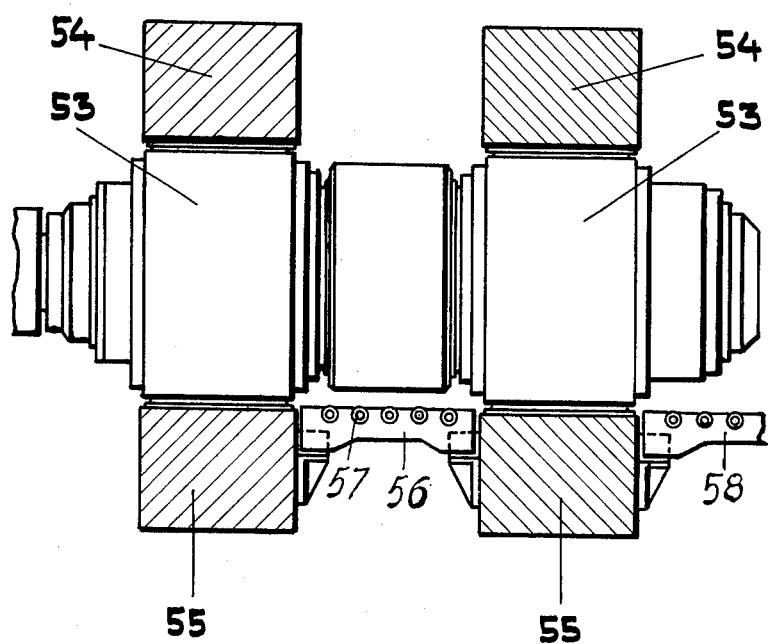

March 15, 1966  W. MARX ETAL  3,239,923
MEANS FOR MOUNTING AND REMOVING THE ROLLS OF A
HORIZONTAL ROLL STAND
Filed June 9, 1964
5 Sheets-Sheet 1
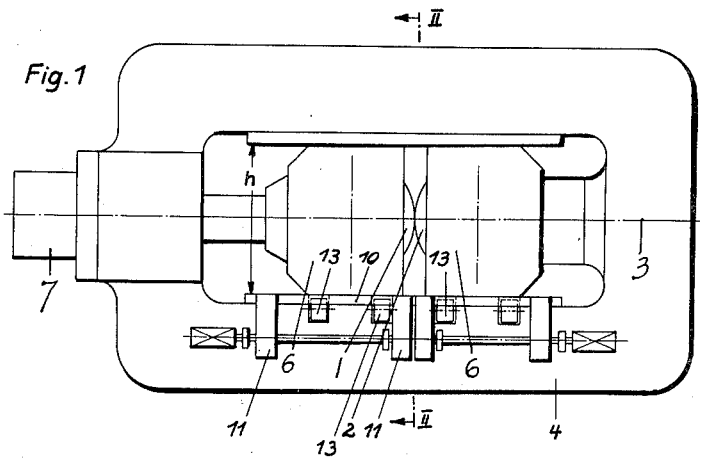
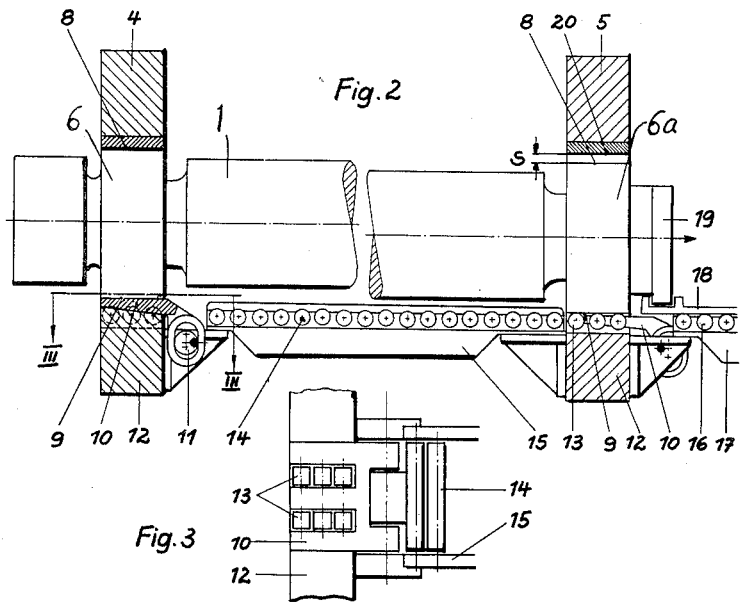

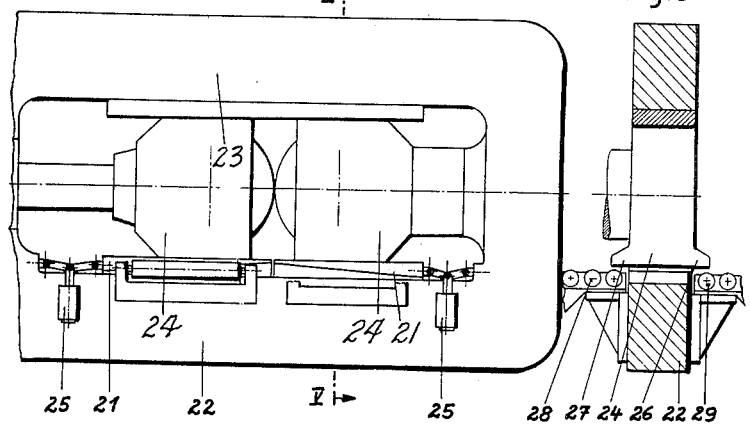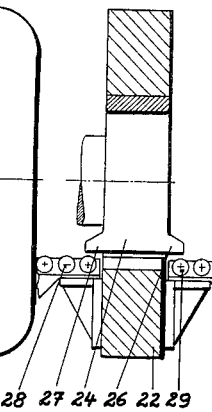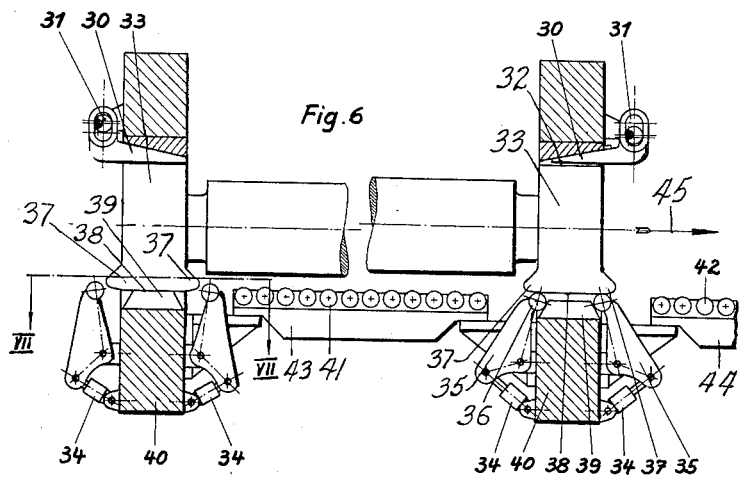

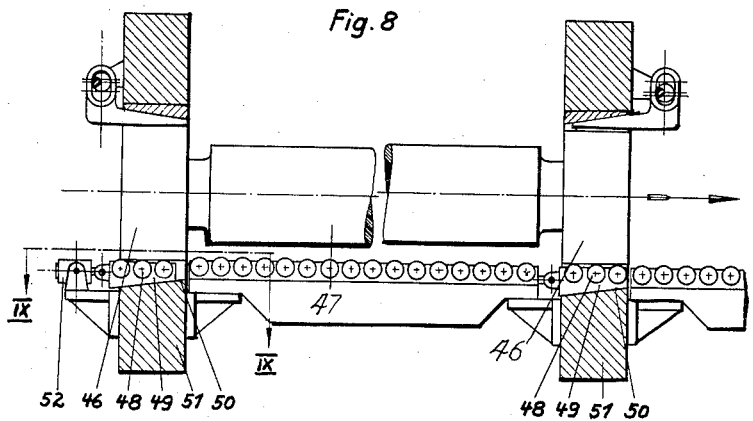
Fig. 8
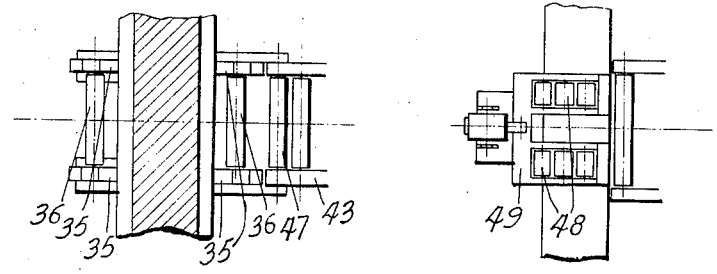
Fig. 7
Fig. 9

Fig: 10

United States Patent Office 3,239,923
Patented Mar. 15, 1966

3,239,923
MEANS FOR MOUNTING AND REMOVING THE ROLLS OF A HORIZONTAL ROLL STAND
Werner Marx, Dusseldorf, and Ulf Geier, Osterath-Bovert, Germany, assignors to Schloemann Aktiengesellschaft, Dusseldorf, Germany
Filed June 9, 1964, Ser. No. 373,611
Claims priority, application Germany, June 21, 1963, Sch 33,441; Jan. 10, 1964, Sch 34,440
9 Claims. (Cl. 29—200)

The object of this invention is to provide an assembling and dismantling device for horizontal roll stands, the roll axes of which are therefore in a horizontal plane, which will require as small an expenditure as possible, and will ensure simple assembling and dismantling of the rolls.

According to the invention this is attained by providing, between the lower crossbeams of the roll stand, at about the level of the bearing surfaces of the chocks, transport rollers, transversely to the direction of dismantling. Owing to the provision of the transport rollers between the housing crossbeams, the rolls admit of being withdrawn from the roll stand in a simple manner, and just as easily re-introduced, by means of a crane which acts at the removal end of the roll. Transport rollers may also advantageously be provided at the mounting and dismounting sides of the roll stand, at the level of the bearing surfaces of the chocks. In this case, for mounting and removing the rolls, it is possible to dispense with a crane, and to manage with winches.

The rollers located outside the roll stand may be so arranged, for the exchanging of a set of rolls, as to be displaceable transversely to the direction of removal.

In order that the bearing surface of the transport rollers may be adjustable in relation to the bearing surface of the chocks in the housing crossbeams, the transport rollers are journalled in frames the height of which is adjustable.

Another method of carrying out the invention consists in locating the bearing surfaces of the trains of rollers above or below the bearing surfaces of the chocks in the assembled condition, and, for the removing or mounting, bringing the bearing surfaces of the chocks to the height of the bearing surface of the roller trains, by raising or lowering the chocks, together with the rolls, by means of wedge-shaped intermediate plates withdrawably arranged in the window apertures of the housing, with a corresponding increase in the height of the roll-housing window apertures. Owing to the fact that the roller trains are not located in the same plane as the guiding surfaces of the lower crossbeams for the chocks or as their bearing surfaces in the mounted condition, and that for the removal or mounting the height of the housing window apertures is increased by withdrawable wedge-shaped intermediate plates, there is the advantage that an exact adjustment of the roller trains to the level of the window apertures of the housing can be omitted, and a jamming of the chocks in the window apertures of the housing is obviated, and furthermore, when being run in, the chocks cannot strike against the cheeks of the housing. In addition to this, owing to the raising or lowering of the chocks on to the roller trains, according to whether the increasing of the height of the window apertures of the roll stand is effected by arranging the intermediate plates above or below the chocks, the result is reliably attained that the chocks are traversed out of the roll stand exclusively upon the rollers of the roller trains, and not additionally upon the bearing surfaces of the roll housings.

When the chocks are mounted by lowering on to the roller trains, roller bodies are arranged in the lower roll housing crossbeam at the same height, so that a continuous roller train is obtained. Moreover it is found advisable to arrange the bearing surfaces of the chocks projecting beyond the lower housing crossbeam in such a way that this bearing region, upon the chocks being lowered, rests upon the roller trains arranged beside the crossbeams. If the chocks are brought to the level of the roller tracks by raising them, this may advantageously be effected by levers provided with roller bodies and rockable by means of a power appliance, these levers engaging underneath the bearing surfaces of the chocks, which are provided with cams. The raising of the chocks may alternatively be advantageously effected by means of roller bodies which are journalled in wedge members, the wedge members being displaceably arranged upon inclined slide tracks in the lower crossbeam. With this arrangement a continuous roller train is likewise provided for changing the rolls.

Constructional examples of the invention are illustrated in the accompanying drawings, in which:

FIGURE 1 shows a front view of a horizontal roll stand, with rolls arranged side by side in a horizontal plane;

FIGURE 2, a cross section on the line II—II in FIGURE 1, the left-hand half representing the chock, with a roll inserted, and the right-hand half the chock with the roll in the lowered condition;

FIGURE 3, a section on the line III—III in FIGURE 2;

FIGURE 4, as a second constructional example, a front view of a horizontal roll stand of a different construction, with intermediate plates displaceable in the roll-stand axis;

FIGURE 5, a section on the line V—V in FIGURE 4;

FIGURE 6, as a third constructional example, a cross section through a horizontal roll stand of a further construction, with liftable chocks, the left-hand side representing the chocks in the mounted condition and the right-hand side in the raised condition;

FIGURE 7, a section on the line VII—VII in FIGURE 6;

FIGURE 8, as a fourth constructional example, a cross section through a horizontal roll stand with chocks liftable by means of roller bodies journalled in wedge-pieces, the left-hand half representing the chock in the mounted condition and the right-hand half the chock in the lifted condition;

FIGURE 9, a section on the line IX—IX in FIGURE 8;

FIGURE 10, a fifth constructional example; and

Figure 11:
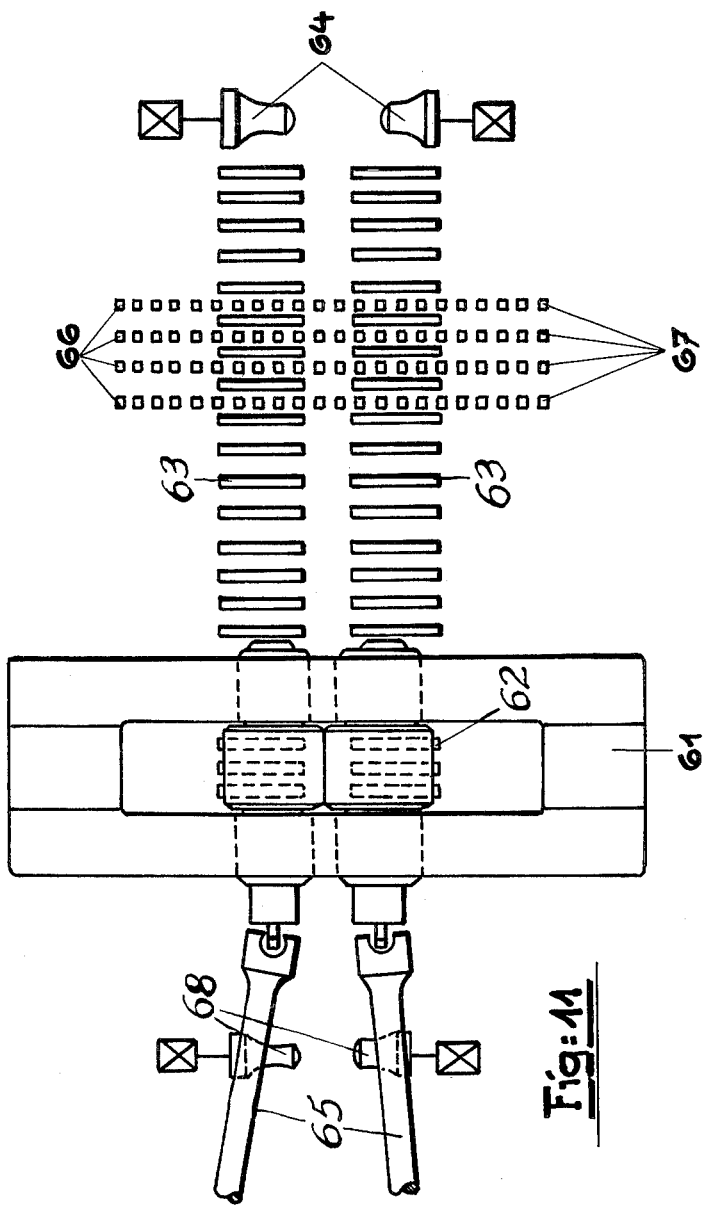

FIGURE 11, the combination of a roll stand according to the invention, substantially according to FIGURES 1 to 3, with driving spindles and with roller beds for transporting the chocks, with rolls, to and fro.

According to FIGURES 1 and 2 the rolls 1 and 2 are journalled in a horizontal plane 3, side by side, in chocks 6 and 6a guided in two housings 4 and 5 (FIGURE 2). The installing of the rolls is effected by means of a diagrammatically represented drive 7. The window-aperture height h corresponds, in the assembled condition of the chocks (left-hand half of FIGURE 2) to the distance between the guiding surface 8 and the bearing surface 9 of the chocks. By the displacement of slidable intermediate plates 10 the window height h can be increased by the amount s. Owing to the fact that each intermediate plate 10 forms at the same time the lower bearing surface of a chock 6 or 6a, the chock, upon the displacement thereof, with the aid of eccentrics 11, into the dismantled position (FIGURE 2, right-hand half) is lowered, together with the roll 1 or 2, until the bearing surface 9 rests upon the roller bodies 13 arranged in the region of the lower crossbeam 12. The bearing plane of these roller bodies corresponds exactly to the bearing plane of the roller bodies 14 of stationary roller trains 15 and to the bearing plane of roller bodies 16 of roller trains arranged at the removal side. After the lowering of the chocks, these are drawn out of the roll stand, together with the rolls, by means of a yoke 18, which engages a projection 19 on the chock 6a. The roller bodies 14 or 16 may extend over the entire breadth of the chocks. The roller bodies arranged in the housing crossbeams have only a slight axial extent, and are enclosed (FIGURE 3) on three sides by an E-shaped intermediate plate 10. Owing to the clearance S between the upper guiding surface 8 of the chock and the guiding plane 20 of the crossbeams 4 and 5, mounting and removal can be effected without jamming.

With the arrangement adopted in FIGURES 4 and 5, wedge-shaped intermediate plates 21 are slidable in the longitudinal direction of the housing crossbeams 22 and 23, with the aid of power appliances 25. Here a lowering of the chocks 24 is likewise effected. At their lower ends they have extensions 26 and 27, reaching out beyond the region of the housing crossbeam 22, and coming to rest, when lowered, upon the roller bodies 28 and 29, arranged beside the crossbeam 22, of the roller trains in question.

According to FIGURE 6 the removing and assembling of the rolls, with the chocks, is effected by raising the latter. For this purpose the upper guiding track 30 of the housing window apertures is slidable by means of eccentrics 31 in the axial direction of the rolls, in order to obtain the requisite clearance between the upper guiding surface 32 of the chocks 33 and the intermediate plates 30 for the purpose of raising the chocks. The raising of the chocks is effected by levers 35, which can be actuated by power appliances 34, and at the upper end of which are arranged roller bodies 36, which engage underneath cams 37 provided on the chocks. In the assembled condition (FIGURE 6, left-hand half) the chocks 33 are located with their lower bearing surfaces 38 upon the guiding track 39 of the lower crossbeam 40, and the intermediate plates 30 are run in for the guiding of the chocks. In the raised position of the chocks (FIGURE 6, right-hand half) the bearing surfaces 38 are located at the level of the bearing surface of the roller bodies 41 or 42 of the roller trains 43 and 44 respectively. In this position they are removed in the direction of the arrow 45, together with the rolls.

In FIGURE 8 the raising of the chocks 46, together with the rolls 47, is effected with the aid of roller bodies 48, which are journalled in wedge-pieces 49. The displacing of the wedge-pieces 49 upon the inclined slideways 50 of the lower crossbeam 51 is effected by power appliances 52. The roller bodies 48 are journalled (FIGURE 9) in two rows side by side in a channel-shaped wedge-piece 49.

In FIGURE 10 the chocks 53 are slidable between the upper crossbeams 54 and the lower crossbeams 55. Between the two lower crossbeams 55 is provided a frame 56, adjustable in a vertical direction, with rollers 57, and, to the right of the lower beam a frame 58, likewise provided with rollers and adjustable in a vertical direction. This construction has however the disadvantage that the chocks 53 are liable to jam between the upper crossbeam 54 and the lower crossbeam 55, so that this construction is indeed to be selected, on account of its simplicity, only with light rolling mills.

In FIGURE 11, 61 denotes the roll stand. Between its lower cross-beams are journalled transport rollers 62. At the entry and exit side, that is to say, on the right hand side of the roll stand, are arranged vertically adjustable transport rollers 63. With the aid of winches 64 the rolls can be drawn out of the roll stand, after the lubricating and cooling installation, not shown, has been disconnected from the chock, and the driving spindles 65 have been uncoupled. As soon as the chocks, together with their associated rolls, have been drawn out of the housings, they are taken up at the same level by the transport rollers 63 and carried away upon the latter. Transversely to the transport rollers 63 are arranged further transport rollers (goose necks) 66, for the purpose of bringing the withdrawn set of rolls out of the entry and exit track formed by the transport rollers 63, in order to liberate them for the fresh set of rolls to be introduced, which can be supplied to the transport rollers 63 upon transport rollers 67. The insertion of the fresh set of rolls is effected with the help of winches 68.

We claim:
1. A horizontal roll stand, with means for mounting and removing the rolls, comprising: two housings, each formed with a window aperture, and each housing including an upper crossbeam bounding the window aperture above, a lower crossbeam bounding the window aperture below, and chocks side by side in the window aperture bearing directly upon the lower crossbeam and extending upwards to the upper crossbeam, these chocks carrying the rolls with their axes in a horizontal plane, and the roll stand also comprising transport rollers, for facilitating the mounting and removal of the rolls, arranged between the lower crossbeams at about the level of the surfaces by which the chocks bear upon the crossbeams.

2. A horizontal roll stand as claimed in claim 1, further comprising transport rollers arranged on the outer side of at least one of the housings, on a level with the said bearing surfaces of the chocks.

3. A horizontal roll stand as claimed in claim 1, further comprising frames in which the transport rollers are journaled, and means for adjusting the height of these frames.

4. A horizontal roll stand as claimed in claim 3, comprising a separate set of transport rollers for each roll.

5. A horizontal roll stand, with means for mounting and removing the rolls, comprising: two housings, each formed with a window aperture, and each housing including an upper crossbeam bounding the window aperture above, a lower crossbeam bounding the window aperture below, and chocks side by side in the window aperture bearing directly upon the lower cross-beam and extending upwards to the upper crossbeam, these chocks carrying the rolls with their axes in a horizontal plane, and the roll stand also comprising transport rollers, for facilitating the mounting and removal of the rolls, arranged between the lower crossbeams and also outside at least one of the housings, at a level differing slightly from the level of the surfaces by which the chocks bear upon the crossbeams, and wedge-shaped intermediate plates adapted to be inserted into and removed from the window apertures to change the height of these apertures slightly, thereby enabling the bearing surfaces of the chocks upon the lower crossbeams to be brought to the same level as the bearing surfaces of the transport rollers.

6. A horizontal roll stand as claimed in claim 5, further comprising roller bodies provided within the region of the lower crossbeam, at the level of the transport rollers, to support the chocks when they have been lowered to the level of the transport rollers.

7. A horizontal roll stand as claimed in claim 5, further comprising projections along the lower edges of the chocks, extending laterally far enough beyond the edges of the lower crossbeams to rest upon one of the rollers between the crossbeams and upon one of the rollers on the outer side of the housing.

8. A horizontal roll stand as claimed in claim 5, further comprising means for raising the chocks to bring their bearing surfaces to the same level as the bearing surfaces of the transport rollers, the said raising means including: levers rockably mounted on the lower crossbeams, power means for rocking the levers, and roller bodies interposed between the bearing surfaces of the chocks and the adjacent ends of the levers.

9. A horizontal roll stand as claimed in claim 5, further comprising means for raising the chocks to bring their bearing surfaces to the same level as the bearing surfaces of the transport rollers, the said raising means including: inclined slideways in the lower crossbeams, wedge-pieces slidable upon these inclined slideways, and roller bodies journaled in the wedge-pieces.

References Cited by the Examiner

UNITED STATES PATENTS

| | | | |
|---|---|---|---|
| 2,655,718 | 10/1953 | Haegele | 29—201 |
| 2,906,564 | 9/1959 | Richardson | 29—148.4 |
| 3,020,628 | 2/1962 | Sage | 29—200 |
| 3,152,504 | 10/1964 | Brown | 29—426 X |

WHITMORE A. WILTZ, *Primary Examiner.*

THOMAS H. EAGER, *Examiner.*